United States Patent
Kastner et al.

(10) Patent No.: US 7,988,553 B2
(45) Date of Patent: Aug. 2, 2011

(54) METHOD AND APPARATUS FOR ENROLLING GAMING DEVICE PLAYERS INTO A PLAYER-TRACKING SYSTEM

(75) Inventors: Steven Robert Kastner, Las Vegas, NV (US); Ted G. Candalino, Las Vegas, NV (US)

(73) Assignee: IGT, Reno, NV (US)

(*) Notice: Subject to any disclaimer, the term of this patent is extended or adjusted under 35 U.S.C. 154(b) by 1257 days.

(21) Appl. No.: 10/198,646

(22) Filed: Jul. 17, 2002
(Under 37 CFR 1.47)

(65) Prior Publication Data
US 2004/0014523 A1 Jan. 22, 2004

(51) Int. Cl.
*A63F 9/24* (2006.01)
*G06F 17/00* (2006.01)

(52) U.S. Cl. .......... 463/29; 463/42; 463/40; 463/25; 382/118; 705/39; 704/275; 235/379; 235/380; 235/382; 395/882; 395/156; 455/558

(58) Field of Classification Search ............ 463/25, 463/29, 36, 40, 42, 43; 705/14, 39
See application file for complete search history.

(56) References Cited

U.S. PATENT DOCUMENTS

| | | | | |
|---|---|---|---|---|
| 4,707,592 A | * | 11/1987 | Ware | 235/379 |
| 4,794,239 A | * | 12/1988 | Allais | 235/462.1 |
| 5,429,361 A | * | 7/1995 | Raven et al. | 463/25 |
| 5,457,305 A | * | 10/1995 | Akel et al. | 705/45 |
| 5,578,808 A | * | 11/1996 | Taylor | 235/380 |
| 5,613,680 A | * | 3/1997 | Groves et al. | 273/138.2 |
| 5,642,160 A | | 6/1997 | Bennett | 348/156 |
| 5,655,961 A | * | 8/1997 | Acres et al. | 463/27 |
| 5,659,800 A | * | 8/1997 | Zhang et al. | 710/62 |
| 5,668,950 A | * | 9/1997 | Kikuchi et al. | 709/217 |
| 5,674,128 A | * | 10/1997 | Holch et al. | 463/42 |
| 5,680,470 A | * | 10/1997 | Moussa et al. | 382/119 |
| 5,811,772 A | * | 9/1998 | Lucero | 235/380 |
| 5,814,796 A | * | 9/1998 | Benson et al. | 235/375 |
| 5,919,091 A | * | 7/1999 | Bell et al. | 463/25 |
| 5,923,848 A | * | 7/1999 | Goodhand et al. | 709/219 |
| 5,940,811 A | | 8/1999 | Norris | |
| 5,952,640 A | * | 9/1999 | Lucero | 235/380 |

(Continued)

FOREIGN PATENT DOCUMENTS

AU 2002326527 2/2003

OTHER PUBLICATIONS http://www.aamva.org/AAMVA/DocumentDisplay.aspx?id={DD161173-6FC1-4DA8-A08C-ED75A83871F1}, Published Jun. 30, 2000 by the American Association of Motor Vehicle Administrators, 90 pages.*

(Continued)

*Primary Examiner* — Paul A D'Agostino
(74) *Attorney, Agent, or Firm* — Weaver Austin Villeneuve & Sampson LLP

(57) ABSTRACT

An apparatus and method for selecting an account for a gaming player is presented. In one embodiment, a preexisting card is electronically read. Information coded into the magnetic stripe or bar code on the preexisting card is decoded. The decoded information is used to identify matching player accounts. The identified player accounts are presented to the user, who can then select one of the accounts. The selected account is then accessed.

22 Claims, 7 Drawing Sheets

U.S. PATENT DOCUMENTS

| | | | | |
|---|---|---|---|---|
| 5,959,277 | A * | 9/1999 | Lucero | 235/380 |
| 6,003,014 | A * | 12/1999 | Lee et al. | 705/13 |
| 6,019,283 | A * | 2/2000 | Lucero | 235/380 |
| 6,048,269 | A * | 4/2000 | Burns et al. | 463/25 |
| 6,077,162 | A * | 6/2000 | Weiss | 463/26 |
| 6,082,887 | A * | 7/2000 | Feuer et al. | 700/91 |
| 6,105,007 | A | 8/2000 | Norris | |
| 6,199,044 | B1 * | 3/2001 | Ackley et al. | 704/275 |
| 6,212,553 | B1 * | 4/2001 | Lee et al. | 709/206 |
| 6,321,981 | B1 * | 11/2001 | Ray et al. | 235/380 |
| 6,327,573 | B1 * | 12/2001 | Walker et al. | 705/14 |
| 6,476,991 | B1 * | 11/2002 | Fernandez et al. | 360/39 |
| 6,508,709 | B1 * | 1/2003 | Karmarkar | 463/42 |
| 6,536,670 | B1 * | 3/2003 | Postman et al. | 235/487 |
| 6,549,950 | B2 * | 4/2003 | Lytle et al. | 709/246 |
| 6,612,928 | B1 * | 9/2003 | Bradford et al. | 463/29 |
| 6,678,664 | B1 * | 1/2004 | Ganesan | 705/39 |
| 6,682,421 | B1 * | 1/2004 | Rowe et al. | 463/25 |
| 6,739,972 | B2 * | 5/2004 | Flanagan-Parks et al. | 463/25 |
| 6,755,344 | B1 * | 6/2004 | Mollett et al. | 235/383 |
| 6,820,808 | B2 * | 11/2004 | Mehler | 235/454 |
| 6,854,642 | B2 * | 2/2005 | Metcalf et al. | 235/375 |
| 6,854,798 | B1 * | 2/2005 | Mason et al. | 297/39 |
| 6,905,411 | B2 * | 6/2005 | Nguyen et al. | 463/25 |
| 7,010,616 | B2 * | 3/2006 | Carlson et al. | 709/246 |
| 7,280,850 | B2 * | 10/2007 | Hama et al. | 455/566 |
| 7,313,760 | B2 * | 12/2007 | Grossman et al. | 715/708 |
| 7,590,602 | B1 * | 9/2009 | Luzzatto | 705/64 |
| 2001/0034734 | A1 * | 10/2001 | Whitley et al. | 707/104.1 |
| 2002/0142846 | A1 * | 10/2002 | Paulsen | 463/43 |
| 2002/0147639 | A1 * | 10/2002 | Williams et al. | 705/14 |
| 2002/0151366 | A1 * | 10/2002 | Walker et al. | 463/42 |
| 2002/0169855 | A1 * | 11/2002 | Maehiro | 709/219 |
| 2002/0179709 | A1 * | 12/2002 | Mehler | 235/454 |
| 2003/0018897 | A1 * | 1/2003 | Bellis et al. | 713/182 |
| 2003/0028480 | A1 * | 2/2003 | Rowe | 705/39 |
| 2003/0046096 | A1 * | 3/2003 | Shah et al. | 705/1 |
| 2003/0054878 | A1 * | 3/2003 | Benoy et al. | 463/29 |
| 2003/0064807 | A1 * | 4/2003 | Walker et al. | 463/42 |
| 2003/0102373 | A1 * | 6/2003 | Swartz et al. | 235/383 |
| 2003/0109306 | A1 * | 6/2003 | Karmarkar | 463/40 |
| 2003/0150907 | A1 * | 8/2003 | Metcalf et al. | 235/375 |
| 2003/0162591 | A1 * | 8/2003 | Nguyen et al. | 463/29 |
| 2005/0009600 | A1 * | 1/2005 | Rowe et al. | 463/29 |
| 2005/0148367 | A1 * | 7/2005 | Natsuno | 455/558 |
| 2006/0178189 | A1 * | 8/2006 | Walker et al. | 463/16 |
| 2006/0188084 | A1 * | 8/2006 | Rogers et al. | 379/265.01 |
| 2007/0015564 | A1 * | 1/2007 | Walker et al. | 463/16 |
| 2007/0155465 | A1 * | 7/2007 | Walker et al. | 463/16 |
| 2007/0173322 | A1 * | 7/2007 | Swamy et al. | 463/42 |

OTHER PUBLICATIONS

Association of Motor Vehicle Administrators (AAMVA) National Standard for the Driver License/Identification Card, AAMVA DL/ID-2000, dated Jun. 30, 2000 (26 pages).*
Australia Examination Report dated Oct. 27, 2008, from corresponding Australian Application No. 2003204272.
Australia Examination Report dated Nov. 6, 2009, from corresponding Application No. 2003204272.
Canadian Office Action dated Nov. 12, 2010 issued in Application No. 2,429,651.
Examination Report dated Dec. 20, 2006, from corresponding Great Britain Application No. GB0311200.0.
Examination Report dated Oct. 16, 2006, from corresponding Great Britain Application No. GB0311200.0.
Examination Report dated Sep. 6, 2005, from corresponding Great Britain Application No. GB0311200.0.
Examination Report dated Apr. 15, 2005, from corresponding Great Britain Application No. GB0311200.0.
British Search Report dated Sep. 15, 2003, from corresponding British Application No. GB0311200.0.
British Examination Report dated Feb. 22, 2006, from corresponding British Application No. GB0311200.0.
British Examination Report dated May 16, 2006, from corresponding British Application No. GB0311200.0.
British Examination Report dated Mar. 9, 2007, from corresponding British Application No. GB0311200.0.
British Decision dated Jul. 11, 2007, from British Patent No. GB2390917.
British Decision of Mar. 19, 2008, from corresponding British Application No. GB0311200.
British Examination Report dated May 7, 2008, from corresponding British Application No. GB0311200.0.
British Examination Report dated Jun. 6, 2008, from corresponding British Application No. GB0311200.0.
British Search and Examination Report dated Oct. 17, 2006, from corresponding British Application No. GB0618052.5.

* cited by examiner

METHOD AND APPARATUS FOR ENROLLING GAMING DEVICE PLAYERS INTO A PLAYER-TRACKING SYSTEM

FIELD OF THE INVENTION

This invention pertains to gaming, and more particularly to enrolling players in player tracking systems.

BACKGROUND OF THE INVENTION

Casino gaming has long been a very successful business. Despite having full knowledge that they have little chance of winning, the allure of the winning a lot of money draws millions of players a year. Whether they play blackjack, any of several varieties of poker, roulette, or slot machines, players dream of beating the house against the odds, and walking away with a big payoff.

In an effort to keep people coming back despite losing money, casinos have implemented a number of changes in recent years. Gone are the days when casinos were dimly lit rooms filled with dense smoke. Today, casinos are air conditioned, well ventilated, and brightly lit. New methods of increasing payouts, such as progressive jackpots, entice players to groups of machines, rather than individual, specific machines. And recognizing that players travel with their families, casinos provide entertainment to non-players, such as children, as well.

One technique casinos have been using of late to keep old players and lure new players is with identification cards. By signing up for an identification card with the casino, players can earn points toward bonuses, designed to encourage loyalty to a particular casino. The identification cards also provide a bonus to the casino: the casino gets information about the player's playing habits.

FIG. 1 shows a schematic of several slot machines in a casino. Slot machines 105, 110, and 115 are all connected to central station 120. The slot machines, like slot machine 105, all provide slot 125 for players to insert an identification card. As players play on slot machines 105, 110, and 115, assuming they insert their identification cards into slot 125, the player's history can be stored for later analysis within central station 120 (for example, on a server).

In the past, creating accounts for players has been a manual operation. Players typically fill out a form, providing their name, address, telephone, and other personal information. The form is then delivered to data entry personnel, who type the information into a computer system. Eventually, a player identification card is generated and mailed to the player. All this takes time: often weeks pass between when the player fills out the form and when the player receives the player identification card.

In addition, players can forget to bring their player identification card with them when they visit the casino. Without the player identification cards, accessing the player accounts typically requires generating a new player identification card. This process, too, takes time.

Accordingly, a need remains for a way to allow players to create and access player tracking system accounts.

SUMMARY OF THE INVENTION

A preexisting card for the player, such as a driver's license or credit card, is electronically read. The information encoded on the card, typically via a magnetic stripe or bar code, is decoded. This information is used to identify possible accounts for the player. The identified accounts are presented to the player. The player then selects the desired account, which can then be accessed.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
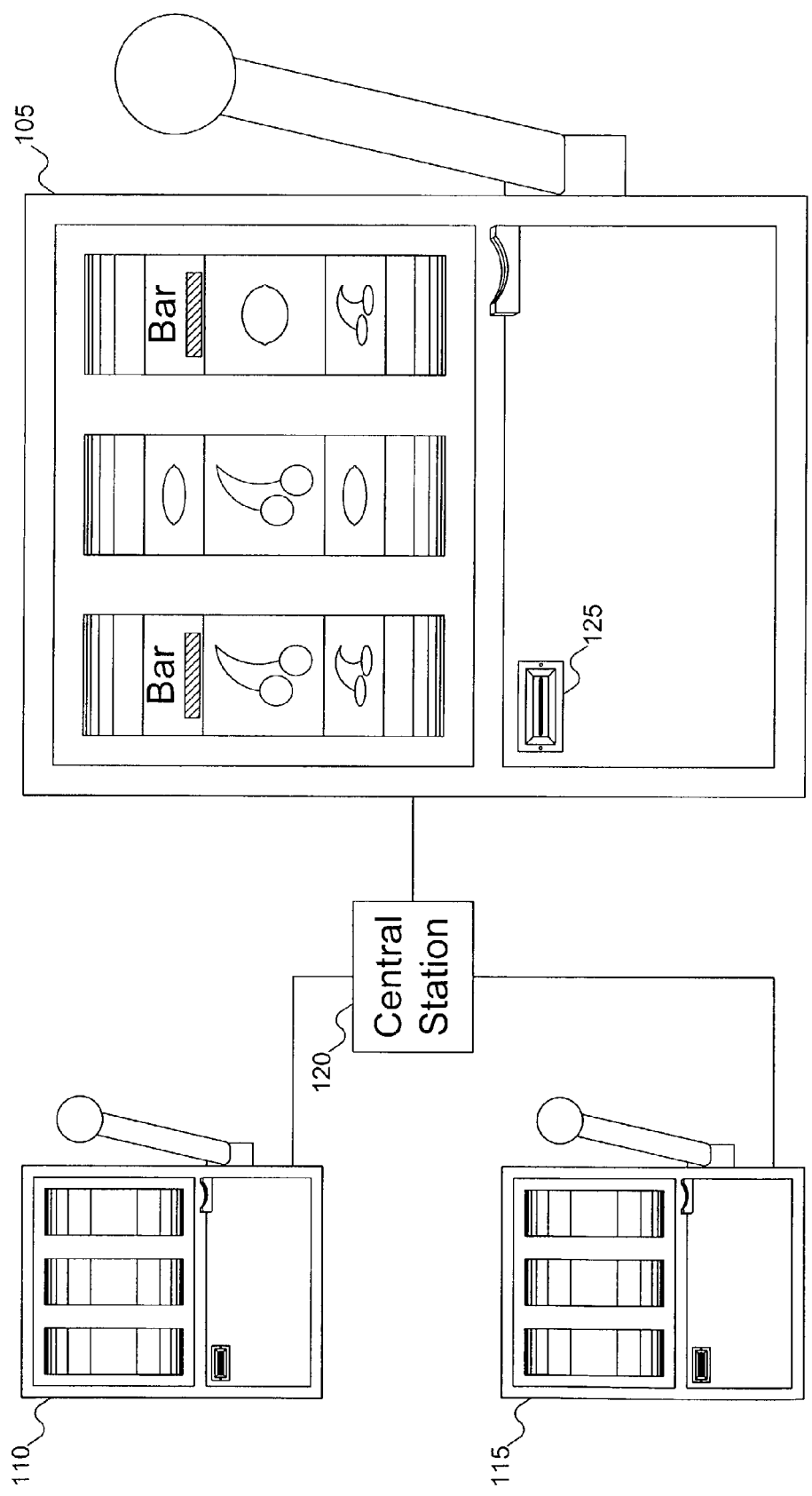
FIG. 1 shows a schematic of several slot machines in a casino.
Figure 2:
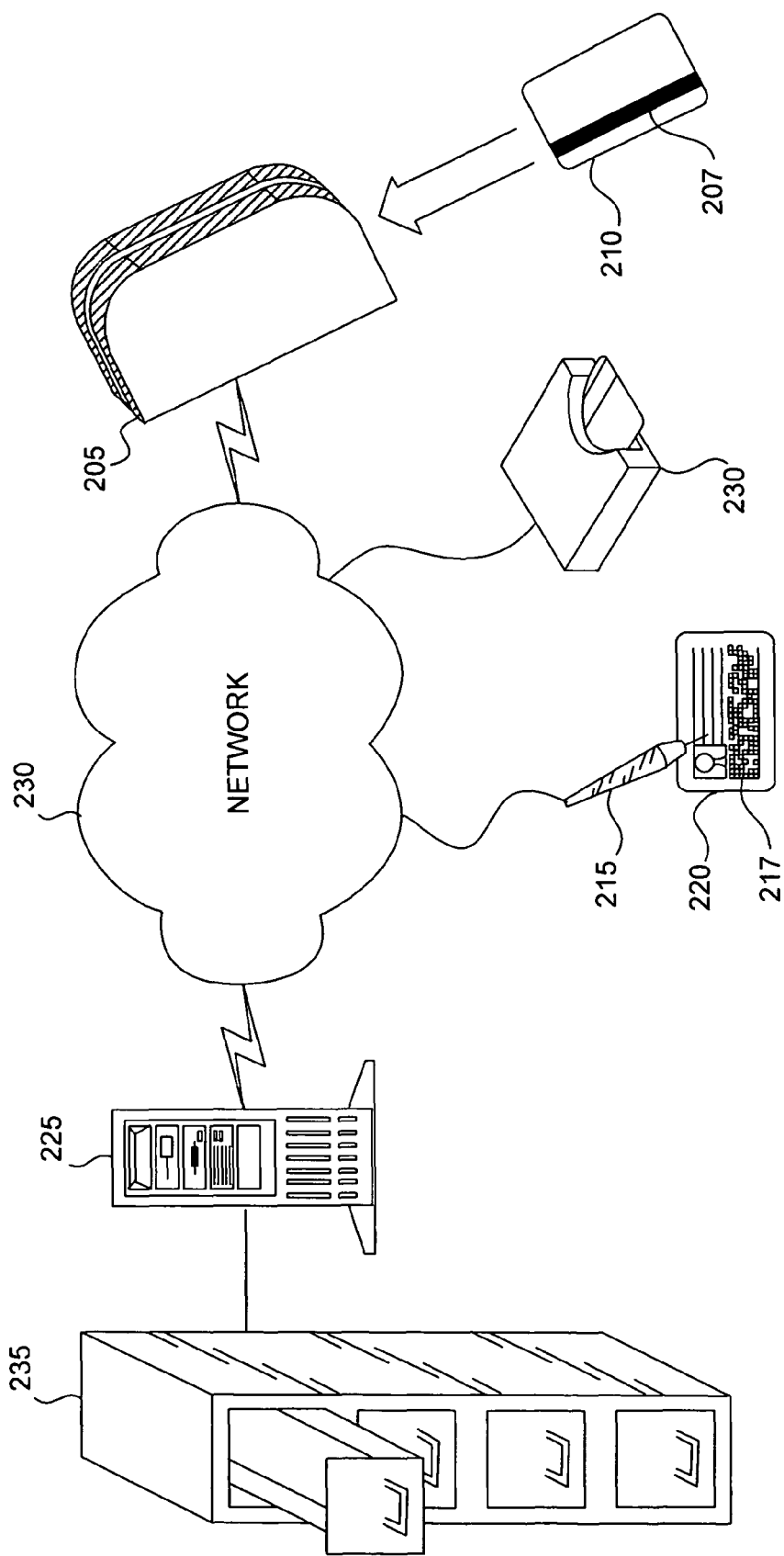
FIG. 2 shows a magnetic stripe reader and a bar code reader designed to use preexisting cards to identify a player account.

FIG. 2 shows a magnetic stripe reader and a bar code reader designed to use preexisting cards to identify a player account. In FIG. 2, magnetic stripe reader 205 is designed to read magnetic stripe 207 from preexisting card 210. In the preferred embodiment, preexisting card 210 is a driver's license. Driver's license are state issued cards, the state being an authority trusted to encode information correctly about the holder of the driver's license. Many states are using magnetic stripes on the back of the card, similar to credit cards (discussed below). The information about the holder of the driver's license is encoded in the magnetic stripe according to a predefined format. Specifically, in the preferred embodiment, the information encoded in the magnetic stripe on the back of the driver's license is encoded according to the American Association of Motor Vehicle Administrators (AAMVA) National Standard for the Driver License/Identification Card AAMVA DL/ID-2000, dated Jun. 30, 2000, which is attached as Appendix A. A person skilled in the art, however will recognize that the information can be encoded according to any standard, provided the standard is known. This makes possible the use of a driver's license encoded according to an updated AAMVA standard to be published in the future.

By swiping preexisting card 210 through magnetic stripe reader 205, the information encoded in magnetic stripe 207 is read from preexisting card 210. This information can then be decoded and used to select a player account, as described below.

AAMVA National Standard for the Driver License/Identification Card AAMVA DL/ID-2000 also describes a standard for encoding information about the holder of the driver's license into a bar code. Also shown in FIG. 2, bar code reader 215 is shown reading bar code 217 from preexisting card 220. Although the mechanics of reading information from a bar code (in FIG. 2, bar code 217 is a two-dimensional bar code, but any bar code encoding can be used) differs from reading information from a magnetic stripe, the end result is the same: information is retrieved from an electronically readable medium issued by a trusted agency (i.e., the state).

A careful reader will observe that, although AAMVA DL/ID-2000 specifies that a bar code be on the back of the driver's license, bar code 217 is shown on the front of preexisting card 220. Preexisting card 220 is drawn incorrectly only to emphasize the fact that preexisting card 220 is a driver's license (even though such is not required, as described below).

AAMVA National Standard for the Driver License/Identification Card AAMVA DL/ID-2000 also describes other ways information can be encoded for electronic retrieval from a driver's license, such as a card with an integrated circuit cards, finger imaging, optical memory cards, and data compression for digital images. Since magnetic stripes and bar codes are the most common electronic media used to store information on preexisting cards, the remainder of this document will refer only to magnetic stripes and bar codes. But a person skilled in the art will recognize how an embodiment of the invention can be modified to operate with other electronically readable media, such as integrated circuit cards, finger imaging, optical memory cards, and the like.

Although the embodiments discussed above only refer to a magnetic stripe reader 205 and a bar code reader 215, a person skilled in the art will recognize that other readers are possible. One such possibility, as illustrated in FIG. 2, is a smart card reader 230, which is designed to read data off a chip embedded with a card.

Once the player information is retrieved from the preexisting card, be it from magnetic stripe 207, bar code 217, or a chip embedded in a smart card, other electronically readable media, the information is transmitted to a computer 225. Computer 225 is shown as a server, including the necessary microprocessor, memory, hard drive, and database access to facilitate player account location. However, computer 225 can be any type of computer system capable of retrieving player accounts from a database based on information read from a magnetic stripe or bar code. Typically, computer 225 is not located in close physical proximity to magnetic stripe reader 205 or bar code reader 215 (especially since there can be many instances of magnetic stripe reader 205 and/or bar code reader 215, but only one server 225). Thus, the information retrieved from magnetic stripe 207 or bar code 217 is transmitted to computer 225 via network 230. Network 230 can be any type of network capable of data transmission: for example, an intranet, extranet, virtual private network tunneled across the Internet, etc.

Once the information is received by computer 225, computer 225 can decode the received information. In the preferred embodiment, computer 225 includes a microprocessor suitably programmed to determine the state that issued the driver's license, and the license number of the card. However, a person skilled in the art will recognize that other information can be decoded: for example, the player's name, address, or any other information encoded in the magnetic stripe or bar code can be decoded.

Computer 225 then accesses account database 235 and locates all known player accounts that match the issuing state and the assigned driver's license number decoded from the information. Note that although typically there will be only one account that matches both the issuing state and the assigned driver's license number, collisions are possible. Therefore, more than one account can be retrieved from database 235.

Although the above description uses a driver's license to locate a player's account, this is only a sufficient condition, not a necessary condition. Any particular value or values can be used to identify a player's account, provided the values are relatively unique. For example, while it would not be meaningful use a person's last name to identify a player's account (the number of Smiths and Joneses in the United States is very large), a player's social security number is a unique identification for those with assigned social security numbers. Similarly, the issuing state and assigned driver's license number are typically unique to an individual. Thus, while a driver's license is used in the preferred embodiment, any relatively unique identifying value or values can be used. For example, a credit card number assigned to a player can be used to identify the player's account. And since the encoding in the magnetic stripe on the back of a credit card is standardized, a player's credit card number can be obtained electronically from their credit card in the same manner as a state identification and assigned driver's license number can be obtained from a driver's license.

In fact, one level of generalization further is possible. Specifically, it is not required that the microprocessor in computer 225 decode the information read from the magnetic stripe or bar code, or even know the encoding. The bit sequence encoded on the card will typically be unique or almost unique, even across different coding schemes. Thus, one player can swipe a driver's license, a second player can swipe a credit card, a third player can swipe a rewards card (e.g., a rewards card associated with a supermarket or other store), and so on. Computer 225 then simply uses the raw, encoded information to identify a player's account, without decoding or even knowing how to decode the information. Of course, if the information read from the card is not decoded, then new information cannot be automatically input if a new account is to be created (other than the bit pattern scanned from the card for identification purposes).

A person skilled in the art will also recognize that all the components of FIG. 2, save the specific structure of database 235, can be generic, off-the-shelf components. No special programming is required for magnetic stripe reader 205 or bar code reader 215, since all they do is read encoded information and transmit that information to computer 225. In the preferred embodiment, computer 225 is specially programmed to decode the information received from magnetic stripe reader 205 or bar code reader 215 (but, as discussed above, decoding is not required). Database 235 can be stored using any commercial database application, and can be queried using any database query language that works with the database language in which database 235 is implemented.

Figure 3:
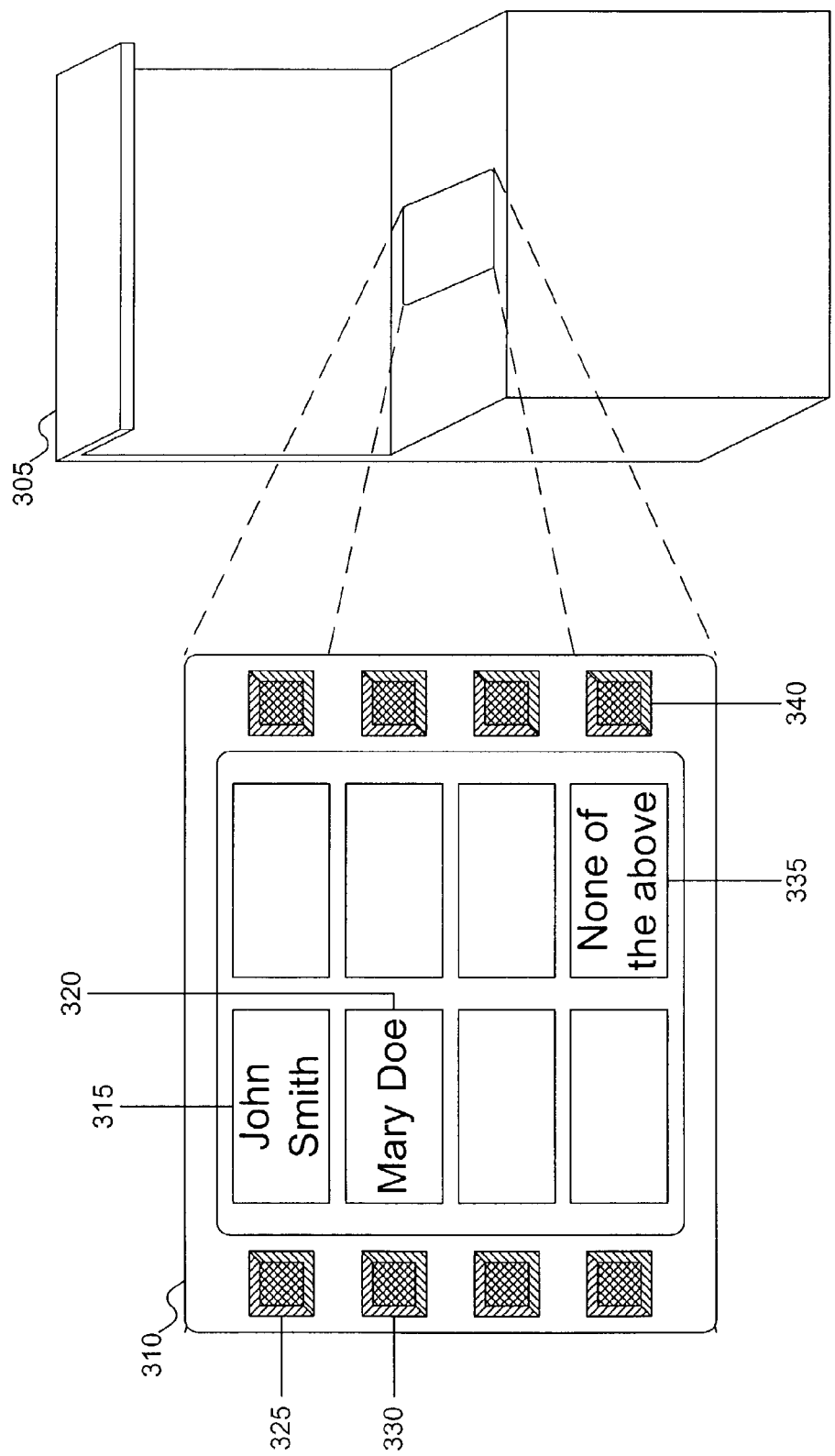
FIG. 3 shows a kiosk presenting a list of possible accounts from which the player can select an account identified by the apparatus of FIG. 2.

FIG. 3 shows a kiosk presenting a list of possible accounts from which the player can select an account identified by the apparatus of FIG. 2. In FIG. 3, two accounts have been located based on the information encoded on the preexisting card. These accounts belong to John Smith and Mary Doe. As shown in FIG. 3, kiosk 305 includes display 310, used to present to the player the possible accounts. Display 310 shows to the player the accounts for John Smith (account 315) and Mary Doe (account 320).

Next to each account name is a button. For example, next to account 315 is button 325, and next to account 320 is button 330. The player can use these buttons to select the account he wishes to access. For example, if the player wishes to access the account for John Smith (account 315), the player presses button 325.

Note that option 335 lets the player create a new account. For example, the player may not have previously registered with the casino, and all the accounts presented in display 310 belong to other players. By selecting option 335 (i.e., pressing button 340), the player can generate a new account.

Figure 4:
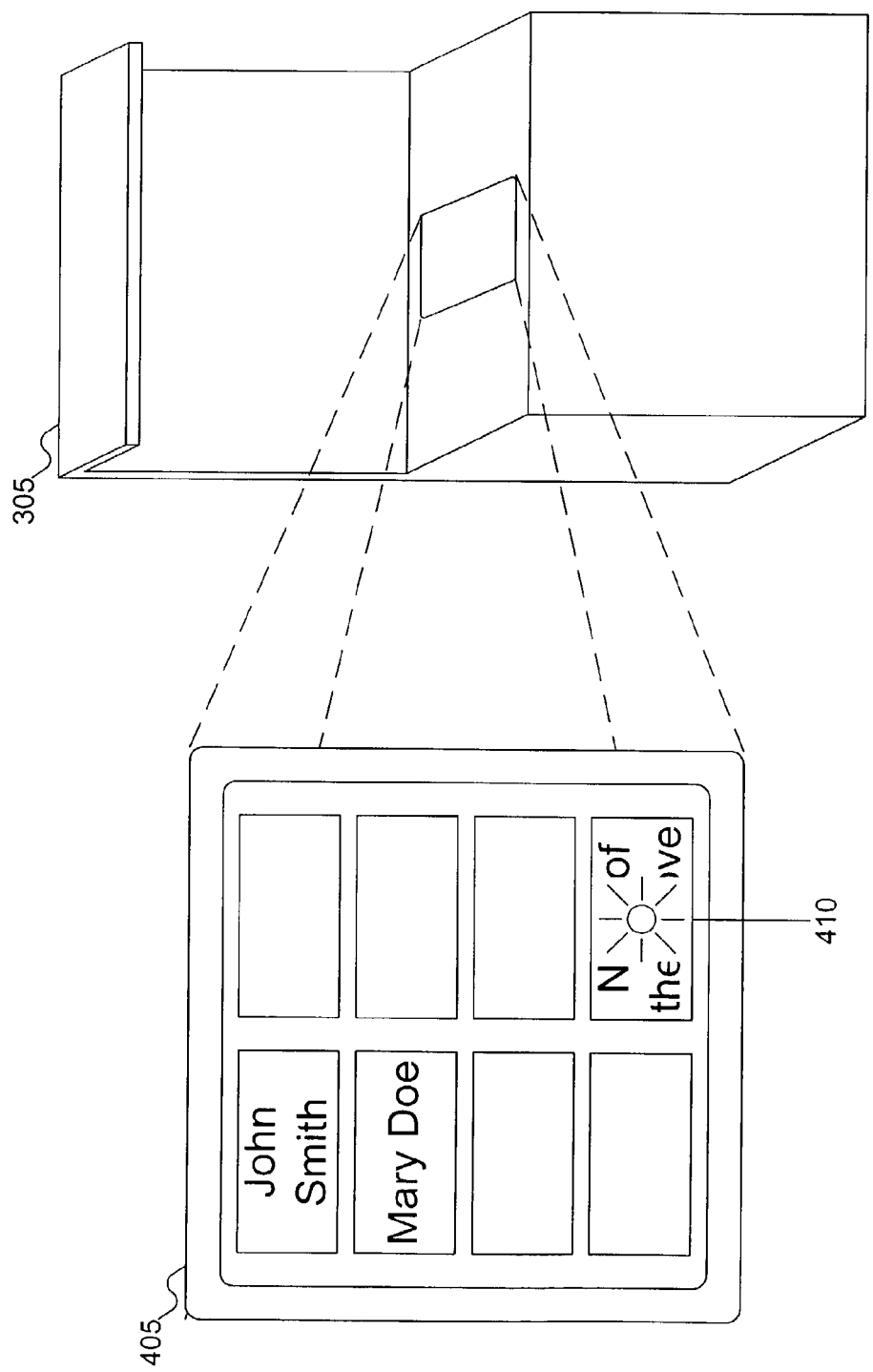
FIG. 4 shows the kiosk of FIG. 3, using a touch-sensitive screen, wherein the player has selected to generate a new account.

Although FIG. 3 shows the account presentation screen as having associated buttons, there are other ways to receive the player's selected account. For example, FIG. 4 shows a variant of the kiosk of FIG. 3. In FIG. 4, kiosk 305 includes touch-sensitive screen 405. Because screen 405 is touch-sensitive, the buttons used in FIG. 3 are not necessary. In FIG. 4, the player has pressed option 410 to generate a new account.

A person skilled in the art will recognize that, beyond buttons and touch-sensitive screens, other hardware can be used to allow the user to select an account. For example, the list of identified accounts can be navigated using a keyboard or a mouse. Or a light pen can be used to select an account on the list. Other techniques can also be used.

Figure 5:
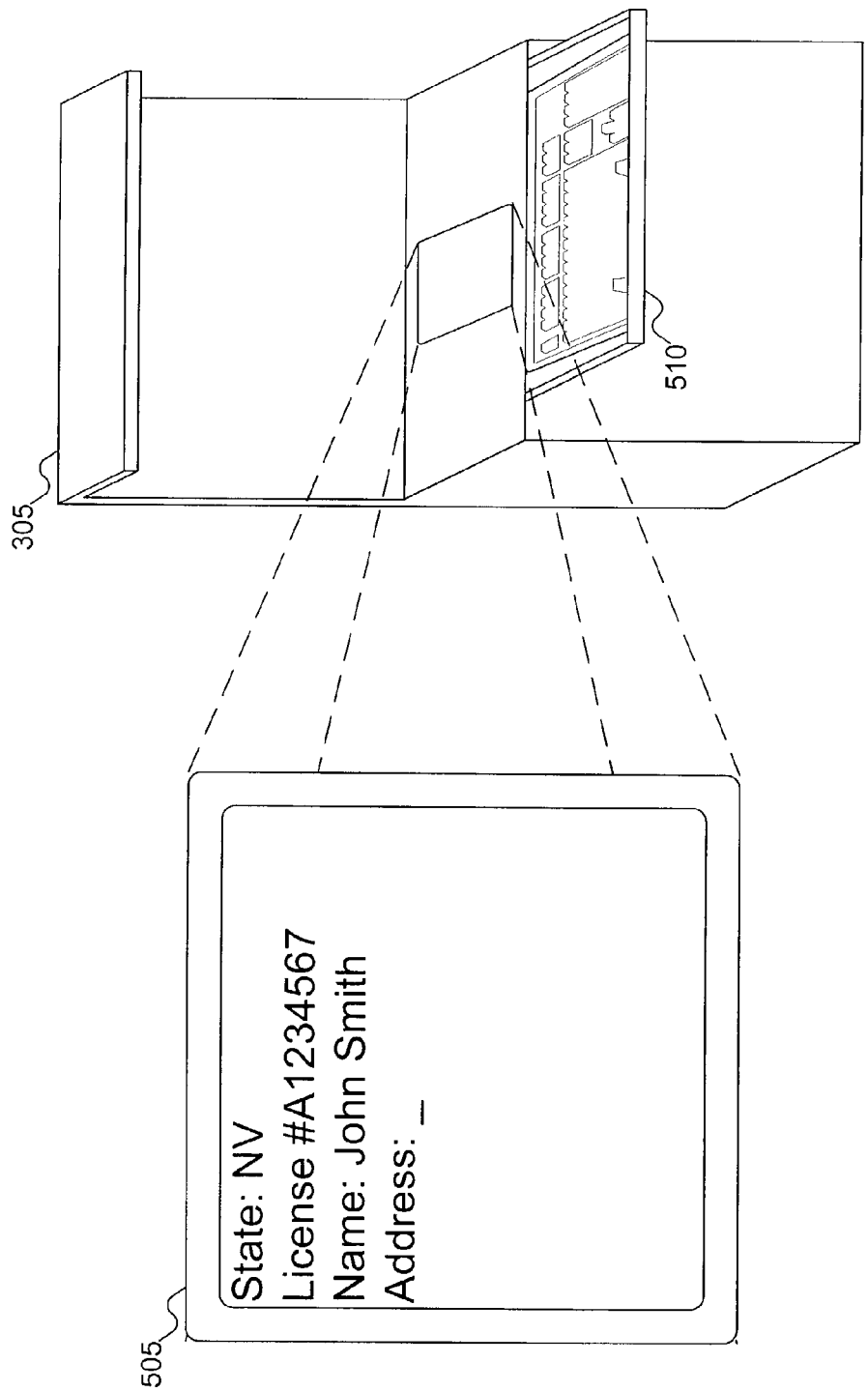
FIG. 5 shows the kiosk of FIG. 4, wherein the player uses a keyboard to enter information for the account not retrieved from the preexisting card.

FIG. 5 shows the kiosk of FIG. 4, wherein the player uses a keyboard to enter information for the account not retrieved from the preexisting card. In FIG. 5, display 505 shows certain information, specifically the player's state identification, assigned driver's license number, and name are automatically filled in from the information retrieved from the player's driver's license. The player enters the remaining information, for example, his home address, using keyboard 510.

Although FIGS. 3-5 show the account selection apparatus as part of a kiosk, a person skilled in the art will recognize that the account selection apparatus can be installed and accessed in other places. For example, the account selection apparatus can be attached to or built into gaming machines or tables. The account selection apparatus can also be part of an attended station, so that an attendant at the casino can assist a player with the use of the apparatus if a problem should arise.

Figure 6A:
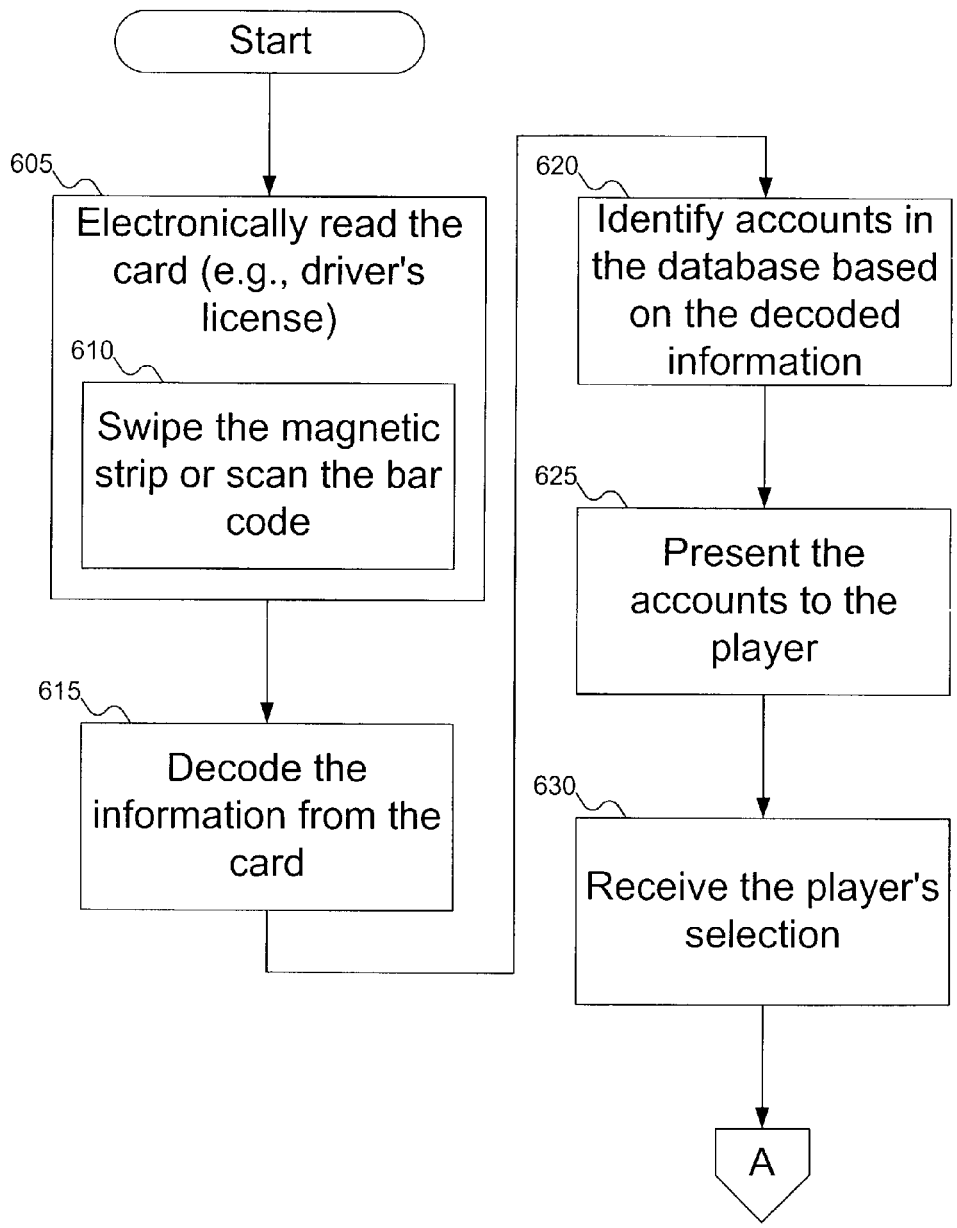
FIGS. 6A-6B show a flowchart of the method for selecting and/or creating a player account using a preexisting card.
Figure 6B:
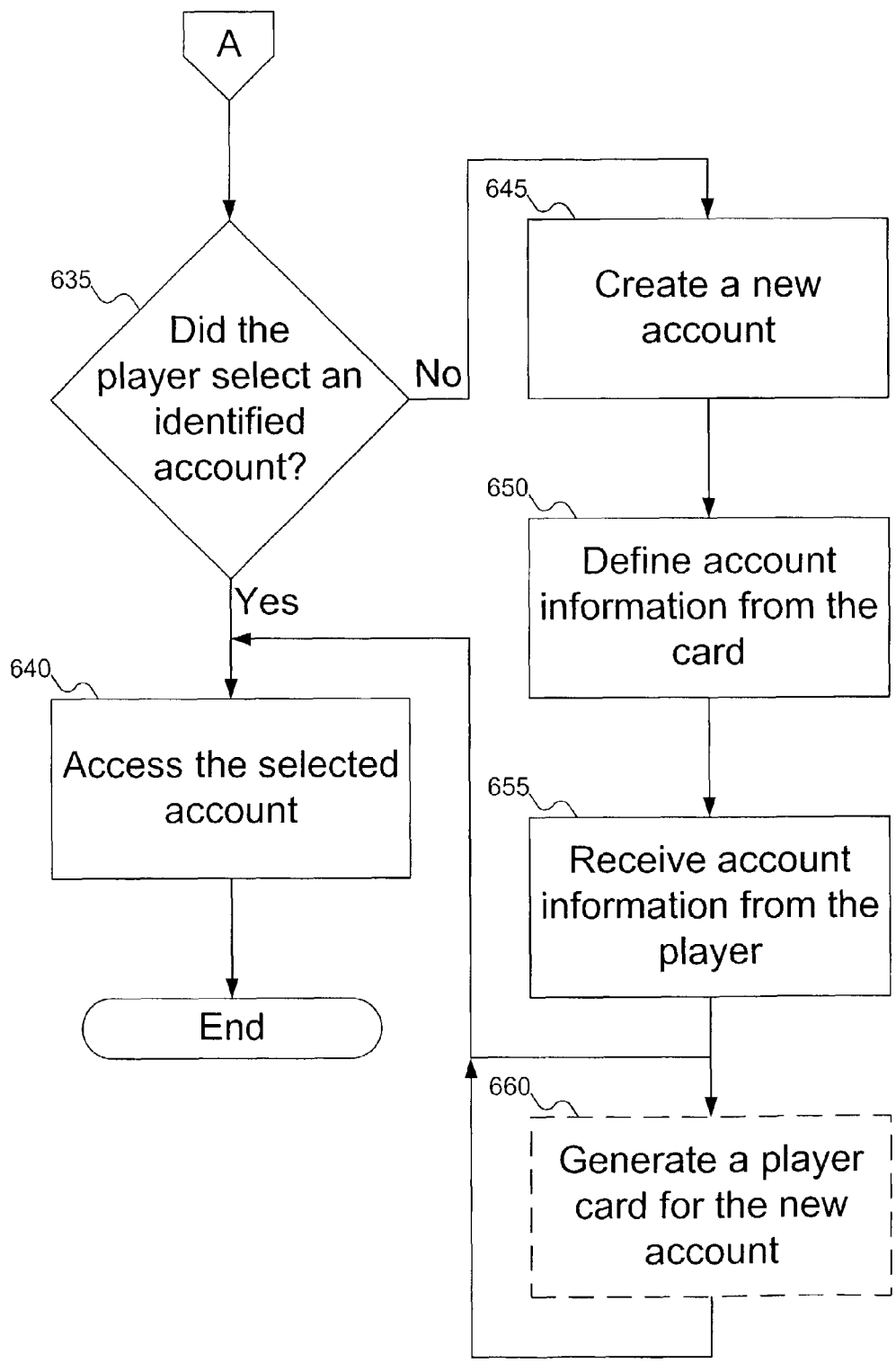

FIGS. 6A-6B show a flowchart of the method for selecting and/or creating a player account using a preexisting card. In FIG. 6A, at step 605, the player's preexisting card is electronically read. For example, as discussed above, at step 610 the magnetic stripe is swiped or the bar code is scanned. At step 615, the information read from the preexisting card is decoded. At step 620, accounts that match the information retrieved from the preexisting card are identified. At step 625, these accounts are presented to the player. At step 630, the player can select one of the accounts.

At step 635 (in FIG. 6B), the system determines if the player selected one of the presented accounts. If the player selected an account, then at step 640 the selected account is accessed. Otherwise at step 645 a new account is created. At step 650 the new account is populated with information read from the preexisting card. At step 655, the new account is also populated with information input by the user. Finally (and optionally), at step 660, a card can be generated for the new account for the player.

As discussed above with reference to FIG. 2, if the information read from the card is not decoded, no information can be automatically input into the new account. Thus, step 650 does not accomplish much (other than to assign the bit pattern to the account, for account identification purposes). The account cannot be automatically populated with information, such as the player's name, if that information cannot be decoded from the preexisting card.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. An apparatus for selecting an account for a player comprising:
   a card reader configured to electronically read a bit sequence of encoded information off a preexisting card issued by an entity other than a casino without decoding the bit sequence of encoded information in order to associate the bit sequence of encoded information with an account for identification purposes;
   a database of casino player tracking accounts, each account identified by a respective bit sequence of encoded information;
   a network; and
   a microprocessor programmed to: use only the bit sequence of encoded information read off a preexisting card without decoding the information to identify and access an account from the database, over the network, identified by the bit sequence of encoded information; present to the player a display of any account identified by the bit sequence of encoded information such that the player may select and access an account from a displayed list of possible accounts; receive an input from the player indicating a selection of a single account from the displayed list of possible accounts; and provide the player with access to the selected single account.

2. An apparatus according to claim 1, wherein the card reader includes a magnetic stripe reader designed to read a magnetic stripe on the preexisting card.

3. An apparatus according to claim 1, wherein the card reader includes a bar code reader designed to read a bar code on the preexisting card.

4. An apparatus according to claim 1, wherein the card reader includes a smart card reader designed to read a chip embedded in the preexisting card.

5. An apparatus according to claim 1, further including a CRT display having a touch sensitive screen operable as a means for receiving a selection from the player of an account from a list of accounts.

6. An apparatus according to claim 1, wherein the preexisting card is drawn from the set including a driver's license, a credit card, and a bonus card.

7. An apparatus according to claim 1, wherein the microprocessor is further programmed to generate a new account associated with the bit sequence of encoded information read from the preexisting card when the database does not include an account associated with the bit sequence of encoded information read from the preexisting card.

8. An apparatus according to claim 1, wherein the microprocessor is further programmed to present the player with an option of generating a new account associated with the bit sequence of encoded information read from the preexisting card.

9. The apparatus according to claim 1, wherein the microprocessor is further programmed to update a selected account from a list of presented accounts by receiving information entered by the player.

10. The apparatus according to claim 1, wherein the bit sequence of encoded information read from the preexisting card is associated with a player account not previously registered using the preexisting card.

11. The apparatus according to claim 1, further including an input device configured to allow a player account to be updated with information input by the player.

12. A method for selecting an account for a player from a database of casino player tracking accounts, each account identified by a respective bit sequence of encoded information, the method comprising:
   electronically reading a bit sequence of encoded information off a preexisting card issued by an entity other than a casino without decoding the bit sequence of encoded information in order to associate the bit sequence of encoded information with an account for identification purposes;

using only the bit sequence of encoded information, without decoding it, to select at least one account from the database of casino player tracking accounts identified by the bit sequence of encoded information;

presenting to the player a display of any account identified by the bit sequence of encoded information such that the player may select and access an account from a displayed list of possible accounts;

receiving an input from the player indicating a selection of a single account from the displayed list of possible accounts; and providing the player with access to the selected single account.

13. A method according to claim 12, wherein electronically reading includes scanning a magnetic strip on a driver's license for the player.

14. A method according to claim 12, wherein electronically reading includes reading a bar code on a driver's license for the player.

15. A method according to claim 12, wherein electronically reading includes reading a smart chip embedded in a driver's license for the player.

16. A method according to claim 12, further including: generating a new account.

17. A non-transitory computer-readable storage media containing a computer program to select an account for a player, the program comprising:

reading software to electronically read a bit sequence of encoded information off a preexisting card issued by an entity other than a casino without decoding the bit sequence of encoded information in order to associate the bit sequence of encoded information with an account for identification purposes; and selection software to use only the bit sequence of encoded information, without decoding it, to select at least one account from a database of casino player tracking accounts identified by the bit sequence of encoded information; to present to the player a display of any account identified by the bit sequence of encoded information such that the player may select and access an account from a displayed list of possible accounts; to receive an input from the player indicating a selection of a single account from the displayed list of possible accounts; and to provide the player with access to the selected single account.

18. An apparatus according to claim 3, wherein the bar code on the preexisting card is a two-dimensional bar code.

19. An apparatus according to claim 5, wherein the means for receiving a selection from the player includes at least one button.

20. A method according to claim 14, wherein reading a bar code includes reading a two-dimensional bar code on the driver's license for the player.

21. A method according to claim 16, wherein generating a new account includes:

establishing the new account; and defining account information from the bit sequence of encoded information.

22. The apparatus according to claim 9, further comprising a player-accessible keyboard to permit the player to enter account information.

\* \* \* \* \*